United States Patent [19]
Hulsey et al.

[11] Patent Number: 5,982,644
[45] Date of Patent: Nov. 9, 1999

[54] VOLTAGE BOOST CIRCUIT FOR A HIGH VOLTAGE CONVERTER

[75] Inventors: Stephen J. Hulsey, Los Angeles; James Lee, Monterey Park, both of Calif.

[73] Assignee: Hughes Electronics Corporation, El Segundo, Calif.

[21] Appl. No.: 09/212,665

[22] Filed: Dec. 16, 1998

[51] Int. Cl.[6] .......................... H02M 3/335; H02M 7/538
[52] U.S. Cl. ............................................. 363/26; 363/133
[58] Field of Search ................................. 363/24, 25, 26, 363/97, 133, 134; 323/222, 266, 273, 282

[56] References Cited

U.S. PATENT DOCUMENTS

| 5,495,164 | 2/1996 | Heng | 323/222 |
|---|---|---|---|
| 5,508,602 | 4/1996 | Borgato et al. | 323/222 |
| 5,694,310 | 12/1997 | Malik et al. | 363/84 |
| 5,867,379 | 2/1999 | Maksimovic et al. | 363/89 |
| 5,886,514 | 3/1999 | Iguchi et al. | 323/299 |

*Primary Examiner*—Matthew Nguyen
*Attorney, Agent, or Firm*—Georgann S. Grunebach; M. W. Sales

[57] ABSTRACT

A current controlled voltage boost circuit for a high voltage converter. The voltage boost circuit includes a boost converter connected to receive an input voltage and a control signal, and output an increased output voltage to the high voltage converter as a function of a control signal. The circuit further includes a current sensing circuit providing an output voltage proportional to the sensed input current to the high voltage converter. The output voltage from the current sense circuit varies a reference voltage that is compared to the boost converter output voltage by an error amplifier. The error amplifier, in turn, outputs a control signal to the boost converter such that the control signal controls the boost converter output voltage as a function of the input current to the high voltage converter.

17 Claims, 3 Drawing Sheets

VOLTAGE BOOST CIRCUIT FOR A HIGH VOLTAGE CONVERTER

TECHNICAL FIELD

The present invention relates to a power supply for high voltage applications, and more particularly to a current-controlled voltage boost circuit for a high voltage converter.

BACKGROUND ART

Traveling wave tubes (TWTs) are a common feature of most communication satellites. A typical communication satellite uses many TWTs to transmit signals, and each TWT is typically powered by a dedicated source commonly referred to as an electronic power conditioner (EPC). The operating power of each TWT can rapidly change from low to high power depending upon the nature of the satellite transmission.

As a result, EPCs for TWTs typically include a linear regulator to absorb output voltage variations due to load changes in the TWT. Large output load current changes require that the linear regulator absorb both a large DC voltage variation as well as transient voltage spikes. The sum of the two voltages can exceed the range of the linear regulator causing excessive output voltage spiking.

Additionally, the use of linear regulators in EPCs is inherently inefficient because they dissipate power. The load current passes through the linear regulator, therefore, the greater the voltage drop required to be absorbed by the linear regulator, the less efficient the EPC. Lower efficiency EPCs degrade the overall performance of the satellite.

Thus, there exists a need to reduce the voltage variation on the output of a high voltage converter powering a TWT. Additionally, there exists a need to reduce the demand on the linear regulator in a typical TWT EPC.

SUMMARY OF THE INVENTION

It is accordingly an object of the invention to provide an improved electronic power conditioner for powering TWTs.

It is a further object of the invention to reduce the voltage variation on the output of a high voltage converter which provides operating voltages for a TWT and, more particularly, to reduce the demand on the linear regulator in a typical TWT EPC.

Similarly, it is an object of the invention to provide a novel electronic power conditioner for powering TWTs in communication satellites.

These and other objects and advantages are accomplished through the use of a voltage boost circuit for a high voltage converter which includes a boost converter. The boost converter is connected to receive an input voltage and a control signal, and provide an increased output voltage to the high voltage converter as a function of the control signal. The circuit further includes a current sensing circuit connected between the output of the boost converter and the input of the high voltage converter. The current sensing circuit provides an output voltage proportional to the sensed input current to the high voltage converter. The output voltage from the current sense circuit varies a reference voltage that is compared to the boost converter output voltage by an error amplifier. The error amplifier, in turn, outputs the control signal to the boost converter such that the control signal drives the boost converter output voltage as a function of the input current to the high voltage converter.

Other objects and advantages of the invention will become apparent when viewed in light of the following detailed description and appended claims, and upon reference to the accompanying drawings.

BEST MODE(S) FOR CARRYING OUT THE INVENTION

Figure 1:
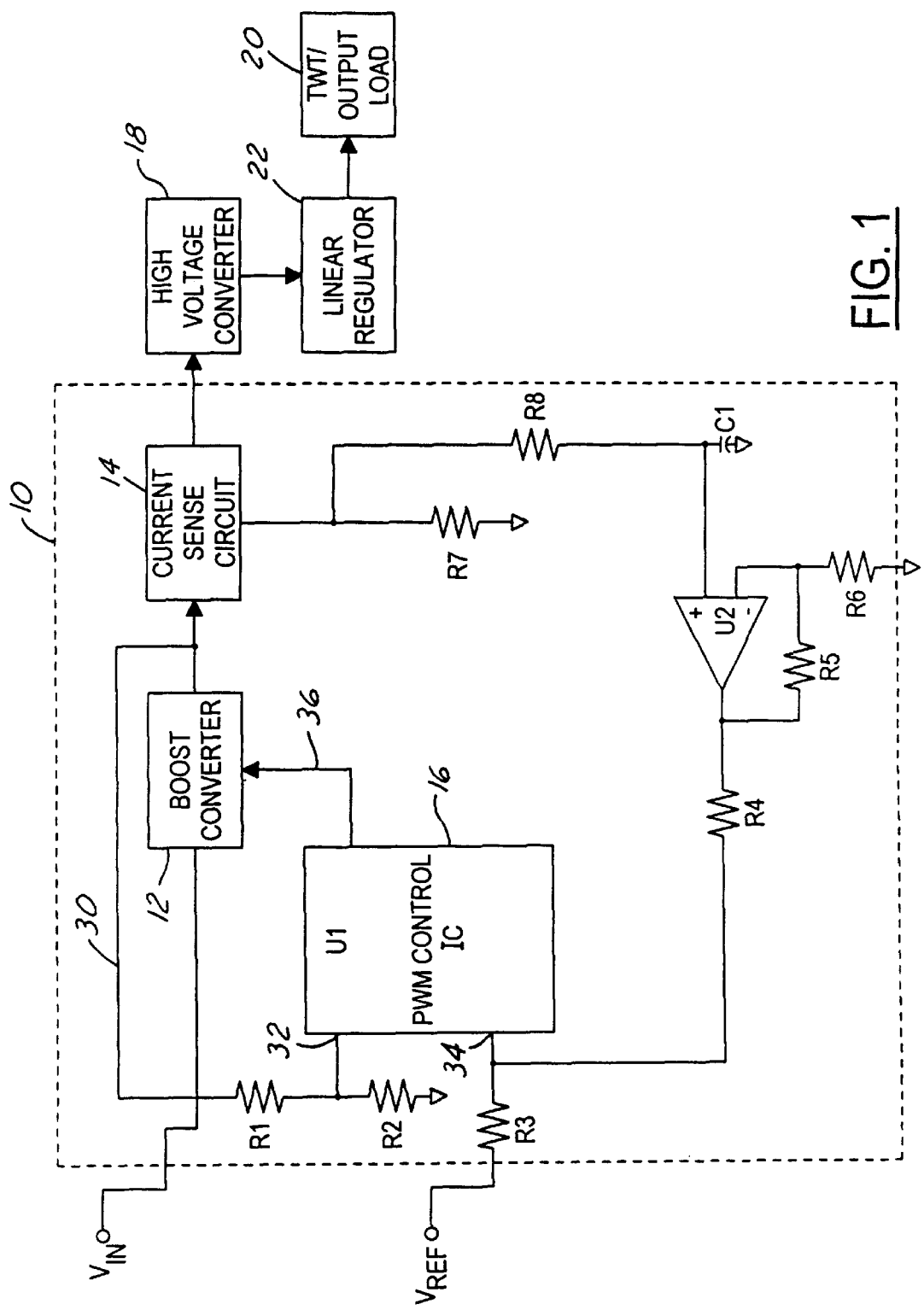
FIG. 1 is a schematic circuit block diagram illustrating a current-controlled voltage boost circuit for a high voltage converter according to the present invention.

Referring now to the drawings, FIG. 1 illustrates a current-controlled voltage boost circuit for a high voltage converter according to the present invention. As shown in FIG. 1, the components of the voltage boost circuit 10 comprise a boost converter 12, a current sense circuit 14, and an error amplifier 16. The primary function of the voltage boost circuit 10 is to increase a varying input voltage to provide a constant voltage to the high voltage converter 18. The secondary function is to increase the constant voltage to the high voltage converter when the input current to the high voltage converter 18, as measured by the current sense circuit 14, increases as a result of an increased load. As stated above, in the case of a TWT 20, the operating power requirements can change suddenly and dramatically. In the past, the variations in the high voltage output as a result of the changing load were absorbed by a linear regulator. A linear regulator 22 is included in the circuit of FIG. 1, however, as explained in more detail below, the use of the voltage boost circuit 10, greatly reduces the demand otherwise required of the linear regulator 22.

In a typical communication satellite, the bus voltage available for delivering power to various systems is +100 VDC. In FIG. 1, this bus voltage is represented as input voltage $V_{in}$. Input voltage $V_{in}$ typically varies from about +95 VDC to +105 VDC. Approximately +115 VDC is preferred for operating the high voltage converter 18 to provide an operating voltage to the TWT 20. Accordingly, a boost converter 12 is used to increase $V_{in}$ as it varies to maintain the preferred approximately +115 VDC input to the high voltage converter 18.

The output voltage of the boost converter is controlled by the voltage feedback loop 30 and current sense circuit 14. The current sense circuit 14 senses the input current to the high voltage converter 18. The current sense circuit 14 detects the input current by sensing the switching current into the high voltage transformer T2 (FIG. 2) of the high voltage converter 18. The sensed input current is converted to a voltage proportional to the current by resistor R7. Transformer switching noise in the system is filtered by resistor R8 and capacitor C1. The resulting DC voltage representing the input current to the high voltage converter 18 is amplified by amplifier U2 with resistors R5 and R6 setting the gain. The output of the amplifier U2 is used to shift the reference voltage $V_{ref}$ that the output voltage of the boost converter 12 is compared to. In this case, $V_{ref}$ is preferably +5 VDC. Resistors R3 and R4 set the amount of reference voltage shift as a function of the input current into the high voltage converter 18.

In the voltage feedback loop 30, resistors R1 and R2 divide the output voltage of the boost converter 12 to that of the reference voltage $V_{ref}$ input to the error amplifier in U1. The amplifier in U1 is preferably part of a pulse width modulation (PWM) control integrated circuit (IC) such as the SG1846 available from Silicon General Corporation.

The amplifier in U1 generates a control signal 36 by amplifying the error between the inverted input 32 of the voltage feedback loop 30 representing the input voltage to the high voltage converter 18, and the non-inverted input 34 of the voltage representing the sensed current input to the high voltage converter 18. The control signal, in turn, determines the duty cycle for the PWM for the boost converter 12.

Figure 2:
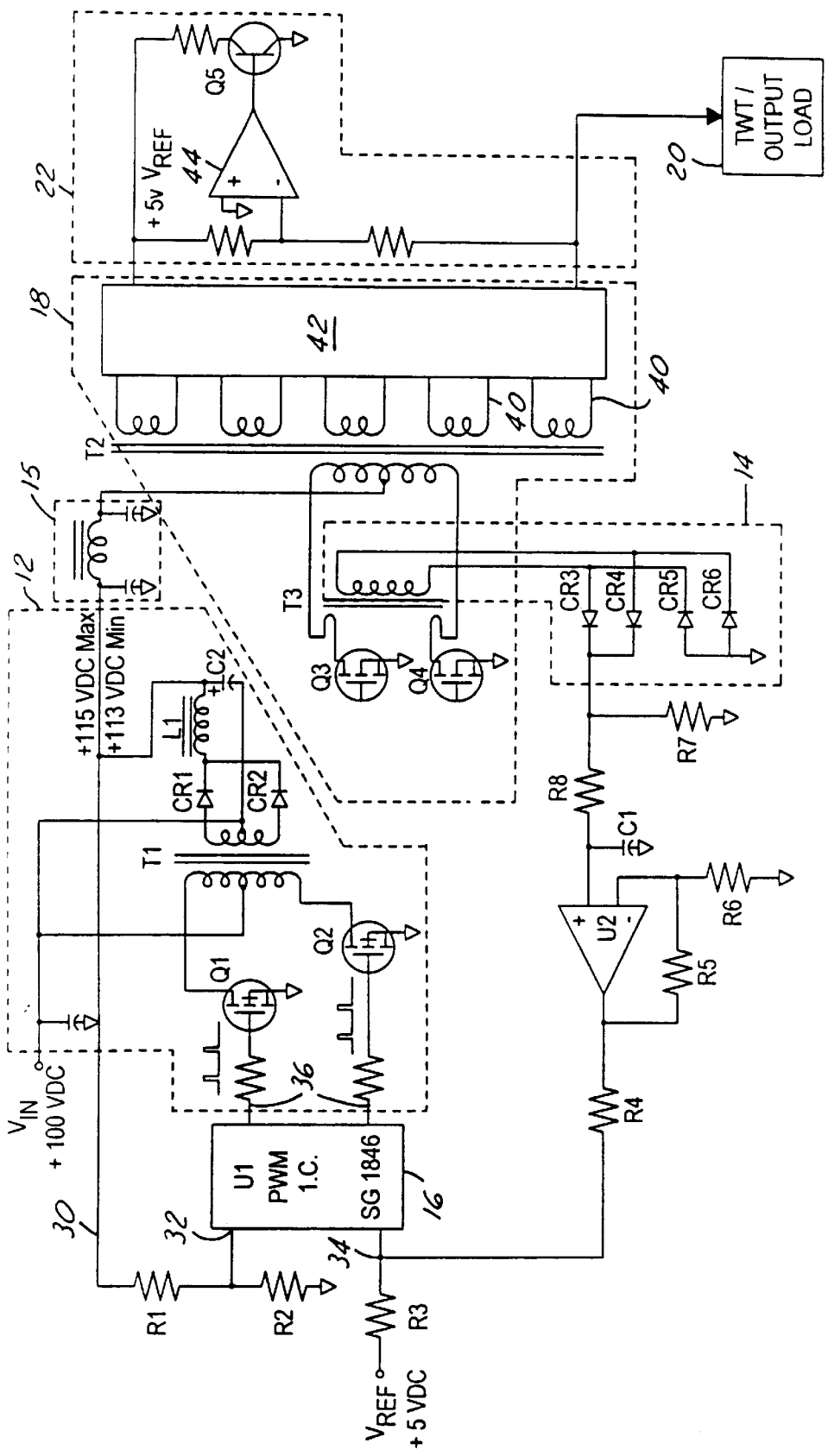
FIG. 2 is a schematic circuit diagram illustrating further detail of the current-controlled voltage boost circuit of FIG. 1.

FIG. 2 illustrates in greater detail the circuit components of FIG. 1. As shown in FIG. 2, the boost converter 12 provides a regulated low voltage that is added to the +100 VDC input voltage Vin to boost the input voltage up to +113 VDC to +115 VDC depending upon the output load. The boosted voltage output is sensed by amplifier U1 via the voltage feedback loop 30. The amplifier U1 compares this voltage to the +5 VDC reference voltage $V_{ref}$, and controls the duty cycle of the drive into transistors Q1 and Q2. Transistors Q1 and Q2, in turn, drive the transformer T1. The output of transformer T1 is rectified by diodes CR1 and CR2 and filtered by inductor L1 and capacitor C2 to provide the low voltage which is added to $V_{in}$ and output as the boosted voltage. The drive signal 36 controls the turn-on duty cycle of transistors Q1 and Q2 to determine the amount of the voltage boost. The drive signal duty cycle varies in response to the sensed current input to the high voltage converter 18 and the output of the voltage of boost converter 12 to maintain a constant boosted voltage as $V_{in}$ varies.

Filter 15 provides resonant shaping of the waveform into the high voltage transformer T2. By tuning filter 15, the current when Q3 or Q4 turns off can be reduced, thereby improving circuit efficiency.

The high voltage converter 18 includes transistors Q3 and Q4 which drive transformer T2 to provide the high voltage output. Transformer T2 has multiple secondary windings 40 which are individually rectified and filtered. The series connected rectifiers and filters 42 provide the final high voltage output.

The output voltage from the high voltage converter 18 is connected to the linear regulator 22. Linear regulator 22 comprises transistor Q5 which maintains a constant high voltage output to the output load 20. Transistor Q5 is controlled by an error amplifier 44 which senses the high voltage output.

The current sense circuit 14 includes a current sense transformer T3 which senses the primary current into the high voltage converter transformer T2 through switching transistors Q3 and Q4. The output current of the current sense transformer T3 is rectified by diode rectifier bridge CR3–CR6. The rectified current produces a DC voltage across resistor R7 representing the primary current into the high voltage converter transformer T2. The voltage across resistor R7 representing the sensed current into the high voltage converter 18 is amplified by U2. The output of amplifier U2 is then used to shift the +5 VDC reference voltage into the PWM control IC U1. Thus, as the high voltage output load increases, the +5 VDC reference voltage is increased, thereby increasing the boosted voltage.

The resulting increase in boosted voltage reduces the range of voltage drop otherwise required to be absorbed by the linear regulator 22. For example, the circuit of FIG. 2 was tested in an EPC designed for a 500 W output capacity. The output of the boost converter 12 was made to vary between +113 VDC and +115 VDC when the load on the high voltage converter 18 varied between zero and 500 W. As a result, the DC output voltage variation of the high voltage converter, before linear regulation, was reduced by half. Accordingly, the linear regulator 22 can be designed to operate with a smaller voltage drop, increasing the efficiency of the electronic power conditioner. In addition, the current controlled voltage boost circuit described herein also reduced voltage spiking on the high voltage output during fast load current transitions.

Figure 3:
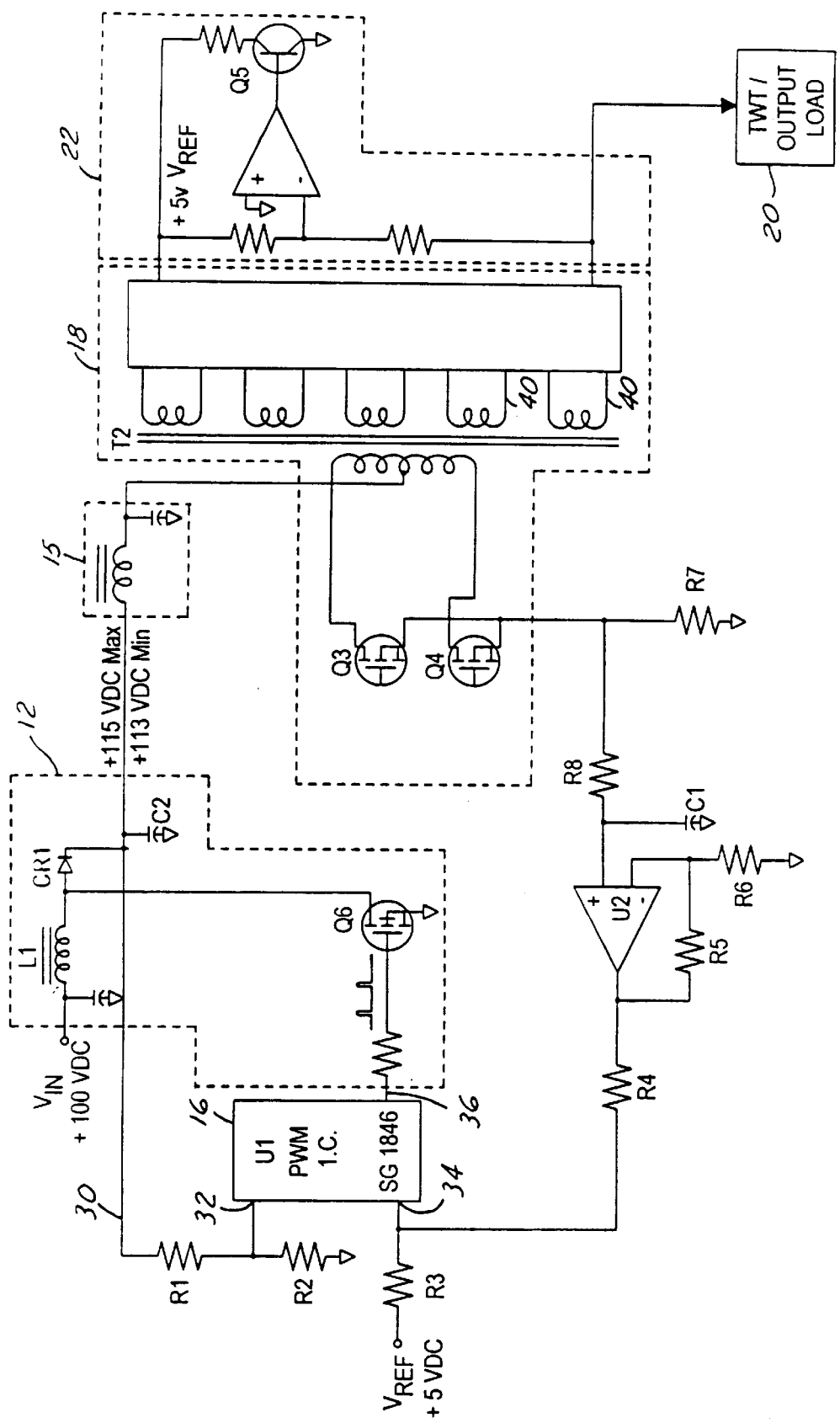
FIG. 3 is a schematic circuit diagram illustrating an alternative embodiment of the current-controlled voltage boost circuit of FIG. 1.

In FIG. 3 there is illustrated an alternative embodiment for the boost converter 12 and the current sense circuit 14. As shown in FIG. 3, the boost converter 12 includes switching FET transistor Q6, input inductor L1, rectifier diode CR1 and capacitor C2. In operation, the boost converter 12 uses the energy stored in inductor L1 to add its flyback voltage to $V_{in}$ to produce the boosted voltage. The duty cycle of transistor Q6, as dictated by drive signal 36, determines the boost voltage.

As shown in FIG. 3, an alternative current sense circuit consists of a current sensing resistor R7 to directly sense the primary current through transistors Q3 and Q4 delivered to the high voltage converter transformer T2. Although more direct than the current sense scheme of FIG. 2, the current sense resistor R7 of FIG. 3 dissipates more power and, therefore, has performance tradeoffs versus the design of FIG. 2.

Accordingly, there has been disclosed an improved electronic power conditioner having a current controlled voltage boost circuit which increases the input voltage to the high voltage converter when the input current to the high voltage converter increases as a result of increased load.

While particular embodiments of the invention have been shown, it will be understood that the invention is not limited thereto since modifications may be made by those skilled in the art, particularly in light of the foregoing teachings. It is, therefore, contemplated that the invention includes all such alternatives, modifications, and equivalents as may be included within the spirit and scope of the appended claims.

What is claimed is:

1. A voltage boost circuit for a high voltage converter comprising:

a boost converter connected to receive as inputs an input voltage and a control signal, the boost converter providing an increased output voltage to a high voltage converter as a function of the control signal;

a current sensing circuit connected between the output of the boost converter and the input of the high voltage converter, the current sensing circuit providing an output voltage proportional to the sensed input current to the high voltage converter; and an error amplifier connected to receive a first input representing the boost converter output voltage and a second input representing the current sensing circuit output voltage, the error amplifier providing as an output the control signal to the boost converter such that the control signal controls the boost converter output voltage as a function of the first and second inputs.

2. The voltage boost circuit of claim 1 further comprising a linear regulator connected to an output of the high voltage converter, the linear regulator providing a regulated output voltage to a traveling wave tube.

3. The voltage boost circuit of claim 1 further comprising a filter circuit for reducing switching noise sensed by the current sense circuit, the filter circuit connected between the output voltage of the current sense circuit and the input of the error amplifier.

4. The voltage boost circuit of claim 1 further comprising an amplifier connected between the output voltage of the current sense circuit and the second input to the error amplifier.

5. The voltage boost circuit of claim 1 wherein the second input to the error amplifier is scaled by a reference voltage, the error amplifier providing as an output the control signal to the boost converter such that the control signal controls the boost converter output voltage as a function of the first and second inputs to the error amplifier.

6. The voltage boost circuit of claim 1 wherein the current sense circuit comprises a current sense transformer, a bridge rectifier having an input and an output, and a resistor, the input of the bridge rectifier connected to the current sense transformer and the output of the bridge rectifier connected to the resistor.

7. The voltage boost circuit of claim 1 wherein the current sense circuit comprises a current sense resistor.

8. The voltage boost circuit of claim 1 wherein the boost converter comprises first and second switching transistors and a transformer, the duty cycle of the transistors being controlled by the control signal, the transistors operatively connected to the transformer, the transformer being further connected to the input voltage for providing an output voltage as a function of the control signal.

9. The voltage boost circuit of claim 1 wherein the boost converter comprises an inductor connected in series between the input voltage and a switching transistor, one of terminals of the switching transistor further connected through a rectifier diode to a capacitor.

10. An electronic power conditioner for powering a traveling wave tube comprising:

a high voltage converter for providing operating voltages to a traveling wave tube;

a linear regulator connected between the output of the high voltage converter and the traveling wave tube;

a boost converter connected to receive as inputs an input voltage and a control signal, the boost converter providing an increased output voltage to the high voltage converter as a function of the control signal;

a current sensing circuit connected between the output of the boost converter and the input of the high voltage converter, the current sensing circuit providing an output voltage proportional to the sensed input current to the high voltage converter; and an error amplifier connected to receive a first input representing the boost converter output voltage and a second input representing the current sensing circuit output voltage, the error amplifier providing as an output the control signal to the boost converter such that the control signal controls the boost converter output voltage as a function of the input current to the high voltage converter.

11. The voltage boost circuit of claim 10 further comprising a filter circuit for reducing switching noise sensed by the current sense circuit, the filter circuit connected between the output voltage of the current sense circuit and the input of the error amplifier.

12. The voltage boost circuit of claim 10 further comprising an amplifier connected between the output voltage of the current sense circuit and the second input to the error amplifier.

13. The voltage boost circuit of claim 10 wherein the second input to the error amplifier is scaled by a reference voltage, the error amplifier providing as an output the control signal to the boost converter such that the control signal controls the boost converter output voltage as a function of the first and second inputs to the error amplifier.

14. The voltage boost circuit of claim 10 wherein the current sense circuit comprises a current sense transformer, a bridge rectifier having an input and an output, and a resistor, the input of the bridge rectifier connected to the current sense transformer and the output of the bridge rectifier connected to the resistor.

15. The voltage boost circuit of claim 10 wherein the current sense circuit comprises a current sense resistor.

16. The voltage boost circuit of claim 10 wherein the boost converter comprises first and second switching transistors and a transformer, the duty cycle of the transistors being controlled by the control signal, the transistors operatively connected to the transformer, the transformer being further connected to the input voltage for providing an output voltage as a function of the control signal.

17. The voltage boost circuit of claim 10 wherein the boost converter comprises an inductor connected in series between an input voltage and a switching transistor, one of terminals of the switching transistor further connected through a rectifier diode to a capacitor.

* * * * *